UNITED STATES PATENT OFFICE.

SILAS T. THURMAN, OF LINCOLN COUNTY, KENTUCKY.

IMPROVEMENT IN COMPOUNDS FOR THE TREATMENT OF SYPHILIS, &c.

Specification forming part of Letters Patent No. 2,186, dated July 23, 1841.

*To all whom it may concern:*

Be it known that I, SILAS T. THURMAN, of the county of Lincoln and State of Kentucky, have discovered a new and useful compound to be used in the treatment of pox or syphilis, lues, gonorrhea, buboes, gleet, and all other syphilitic diseases and affections of any and every kind whatever in males or females, also in the treatment of leucorrhea, whites, or fluor albus in females; and I do hereby declare that the following is a full and exact description of each ingredient, together with its quantity composing said compound.

First take of poke-root, green, twelve pounds. Cut the same in small pieces, so as to separate all the rotten or defective parts. Clean all well before using any. (I will here remark that all roots are better in the fall or winter than any other time.) Put the twelve pounds of clean root as aforesaid in a kettle with sixteen gallons, and boil the same down to half a gallon. I then let roots and water remain together until it gets cold. I then press the roots, so as to get all the substance out of them. I then strain it and let it stand, and commence the other portion of my tea or compound, for which I take in the second part sarsaparilla seven ounces, when dry. Then take half the sarsaparilla and put in three pints of good whisky or apple brandy, and let it stand until it extracts all the strength from it. Then take twelve ounces of cedar-tops and split the largest branches very small, and then put the cedar-tops, the other half of the sarsaparilla, six ounces of running-brier roots, when green, (in that state they are preferable;) rattle-weed, four ounces of the root; half pound of sumach-branches. These last five ingredients I put in a sixteen-gallon kettle full of water and boil down slowly to half a gallon. (The cedar, I would here remark, I do not put in until it is boiled about half down, as the strength of the cedar-tops incline to evaporate.) Strain this and let it cool. Then mix the poke-root tea and this last-mentioned tea together. Then pour off the three pints of whisky, which was in the first half of the sarsaparilla, in with the whole compound. It is then fit for use; but every time before using shake it well.

In cases of pox or syphilis, take each night and morning two and one fourth drams of sulphur. In no other disease is it necessary. The patient should keep the bowels open gently with common epsom salts, and keep free from exposure or damp weather. The patient will take every morning, noon, and night three ounces at a time of the tea or compound. After the patient commences, and the bowels properly opened they must get bled every few days until the blood becomes of a pure or natural color. The affected parts in all diseases should be washed in weak soap-suds at least three times a day, so as to never let any of the virulent matter remain long at any time; but the whites in females should always be washed in cold water and nothing else, also in cases of gleet; but in both the last-mentioned diseases the tea is to be used as above described. In any common case of all the above-described diseases ten or twelve days will effect a perfect cure, unless calomel has been taken; then it will require longer, and it will leave the constitution unhurt. Calomel is prohibited in all cases whatever and invariably; but, in cases of pox, the ulcers must be greased every time after washing, as above stated, and wiped dry and anointed with red precipitate.

What I claim as my discovery, and desire to secure by Letters Patent, is—

The compound formed by the above-described ingredients and process, using for that purpose a smaller or greater quantity of the same ingredients to make a smaller or greater quantity of the compound.

SILAS T. THURMAN.

Witnesses:
 FON T. FOX,
 THO. HUNTON.